United States Patent [19]
Miyata et al.

[11] Patent Number: 5,384,391
[45] Date of Patent: Jan. 24, 1995

[54] POLYARYLENE SULFIDE AND PREPARATION THEREOF

[75] Inventors: Hiroshi Miyata; Hiroshi Inoue, both of Mie; Akira Akimoto, Kanagawa, all of Japan

[73] Assignee: Tosoh Corporation, Tokyo, Japan

[21] Appl. No.: 173,871

[22] Filed: Dec. 27, 1993

Related U.S. Application Data

[63] Continuation of Ser. No. 924,930, Aug. 5, 1992, abandoned.

[30] Foreign Application Priority Data

Aug. 6, 1991 [JP] Japan .................... 3-219325
Oct. 15, 1991 [JP] Japan .................... 3-293850

[51] Int. Cl.⁶ .................... C08G 65/40; C08L 71/10
[52] U.S. Cl. .................... 528/377; 528/378; 528/379; 528/388
[58] Field of Search ............ 528/377, 378, 379, 388

[56] References Cited

U.S. PATENT DOCUMENTS

| | | | |
|---|---|---|---|
| 3,755,268 | 8/1973 | Fritze | 528/379 |
| 4,605,731 | 8/1986 | Evans et al. | 528/378 |
| 4,740,583 | 4/1988 | Brunelle et al. | 528/378 |
| 5,097,008 | 3/1992 | Krabbenhoft et al. | 528/378 |

FOREIGN PATENT DOCUMENTS

| | | |
|---|---|---|
| 0225471 | 6/1987 | European Pat. Off. |
| 0279217 | 8/1988 | European Pat. Off. |
| 0285111 | 10/1988 | European Pat. Off. |
| 03044792 | 3/1989 | European Pat. Off. |
| 0355542 | 2/1990 | European Pat. Off. |
| 0372252 | 6/1990 | European Pat. Off. |
| 0374462 | 6/1990 | European Pat. Off. |
| 0379014 | 7/1990 | European Pat. Off. |
| 0413257 | 2/1991 | European Pat. Off. |
| 0520370 | 12/1992 | European Pat. Off. |

*Primary Examiner*—John C. Bleutge
*Assistant Examiner*—Helen F. Lee
*Attorney, Agent, or Firm*—Sughrue, Mion, Zinn, Macpeak & Seas

[57] ABSTRACT

A process for preparing polyarylene sulfides which comprises providing at least one cyclic arylene sulfide oligomer of the formula

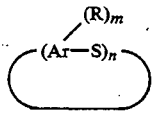

I wherein S represents a sulfur atom, groups Ar, which may be the same or different, represent each an arylene radical having 6–24 carbon atoms, groups R, which may be the same or different, represent each a $C_1$-$C_{12}$ alkyl radical, or a $C_1$-$C_{12}$ alkoxy radical, or a primary or secondary amino group, n is an integer of from 2 to 50, and m is an integer of from 0 to 15, and heating said cyclic oligomer I in the presence of a ring opening polymerization catalyst so as to form polyarylene sulfide. The process produces polyarylene sulfides improved in chemical, physical and mechanical properties.

14 Claims, No Drawings

POLYARYLENE SULFIDE AND PREPARATION THEREOF

This is a Continuation of application Ser. No. 07/924,930 filed Aug. 5, 1992 now abandoned.

BACKGROUND OF THE INVENTION:

1. Field of the Invention

This invention relates to polyarylene sulfides and a process for preparation thereof. In particular, the invention relates to polyarylene sulfides exhibiting excellent mechanical properties, heat resistance and chemical resistance properties and which have a narrow molecular weight distribution and also to a process for preparing polyarylene sulfides of such advantageous characteristics. More particularly, the invention concerns a process for preparing such polyarylene sulfides by ring opening polymerization of cyclic arylene sulfide oligomers.

2. Prior Art

Polyarylene sulfides have excellent heat and chemical resistance properties and, hence, have attracted a good deal of attention as materials useful for producing parts for electrical and electronic instruments, automotive parts and the like. Polyarylene sulfide may be formed or molded, for example by injection or extrusion molding techniques, into various parts, films, sheets, fibers and the like. These molded products have been used in a wide range of applications where high heat and chemical resistance properties are required.

Generally, the known processes for preparing polyarylene sulfides are based on a desalting condensation polymerization involving a nucleophilic reaction between a dihalo-aromatic compound and an alkali metal compound, such as sodium sulfide, in an organic amide solvent, such as N-methyl pyrrolidone, see for example Japanese Patent Publication, KOKOKU, No. 45-3368. However, since this type of processes involve the low reactive aromatic nucleophilic reaction, it is necessary to effect the processes at a high temperature and a high pressure. Further it is required to employ a high boiling polar solvent, such as N-methyl pyrrolidone, that is very expensive. The consequent recovery of the expensive solvent consumes a large amount of energy and accordingly adds to the process cost. Furthermore, the processes produce an undesirably large proportion of by-product salt, such as sodium chloride, which requires additional steps for removing the by-product salt, such as washing and separation steps with making the process and apparatus complicated. It is difficult to completely remove the by-product salt by the most conventional washing, for example, with water.

In addition, the polymers produced by the processes contain chlorine and sodium atoms at the ends of the polymeric chains. Commercially available polyarylene sulfides have usually a sodium content on the order of 1,000-3,000 p.p.m. and a chlorine content on the order of 2,000-4,000 p.p.m. The alkali metal salt residue at such a level in the product polymers will present difficulties, for example deterioration of the physical properties, such as electrical property. For example, in the case where a polyarylene sulfide material having high contents of sodium and chloride is used for sealing or encapsulating electronic devices on parts, such as IC, the insulation of circuit would be deteriorated by moisture uptake or the members, such as electrode and lead wire frame, would be carroded or even disconnected. These would result in deterioration of the characteristics of electronic elements or damage and fault of the elements. These undesirable phenomena have been recognized in the art.

It has been noted that the polyarylene sulfides produced by the known processes have, generally, a very wide range of molecular weight distribution, typically from 5 to 20 as expressed as ratio of the weight average molecular weight, Mw, to the number average molecular weight, Mn (i.e. Mw/Mn ratio). the higher molecular weight components or fractions in a polyarylene sulfide product tend to contribute to poor flowability and formability, while the lower molecular weight components or fractions contributing to poor mechanical and chemical properties and others.

Recently, a plenty of attention has been focussed on development of novel processes for producing polyarylene sulfides. A typical example is a process in which diphenyl disulfide or thiophenol is subjected to cationic-oxidative polymerization with a Lewis acid (see Japanese Patent Public Disclosures. KOKAIs, Nos. 63-213526 and 63-213527). Another example is a process in which diphenyl disulfide or thiophenol is subjected to oxidative coupling polymerization with oxygen using a catalyst in the presence of an acid (see Japanese Patent Public Disclosure, KOKAI, No. 2-169626). According to the recently proposed processes, unbranched polyphenylene sulfides may be produced at a high yield under mild conditions. However, generally the products exhibit such a low melting point and molecular weight that they as produced cannot be employed successfully in molding applications, for example in injection molding. Furthermore, the processes employ a large amount of expensive Lewis acid or oxidant and require a prolonged reaction time. These difficulties give rise to an increased production cost and other disadavantages in the industrial practice.

Methods for reducing the content of the residual by-product salt in polyarylene sulfides have been also proposed, for example, a method in which the crude polymer is washed with hot water (see Japanese Patent Public Disclosure, KOKAI, No. 55-156342), and a method in which the crude polymer is treated in an aromatic solvent at an elevated temperature (see Japanese Patent public Disclosure, KOKAI, No. 59-219331). Although these methods are effective for removal of the residual sodium content, they are not satisfactory for removal of the residual chlorine content and the polymer treated thereby may still contain the residual chlorine on the order of 2,000-3,000 p.p.m.

Japanese Patent Public Disclosure, KOKAI, No. 62-106929 proposes a method for reducing the residual chlorine content in polyarylene sulfide in which the crude polymer is treated with an alkali metal salt of mercapto group-containing compound at an elevated temperature. A highly pure polymer can be obtained by the method, but the product polymer has an unduly broad molecular weight distribution corresponding to Mw/Mn ratio of about 6-20.

On the other hand, a method for obtaining a polyarylene sulfide of a narrow molecular weight distribution is disclosed in Japanese Patent public Disclosure, KOKAI, No. 2-182727, which method comprising washing the crude polymer with an organic polar solvent at an elevated temperature. However, this method is not effective for removal of the chlorine content, so that the product polymer may have a residual chlorine content on the order of 2,000-3,000 p.p.m.

As above-discussed, techniques which are effective both for narrowing the molecular weight distribution of polyarylene sulfides and for reducing the contents of residual alkali metal and halogen in polyarylene sulfides have not been established.

Now, poly(phenylene sulfide) oligomers are known to be utilizable for preparing useful cured products, see U.S. Pat. No. 4,046,749. This patent discloses a method in which poly(phenylene sulfide) oligomers are heated at elevated temperatures in the presence of oxygen gas. The products are partially cross-linked via oxygen linkages. The resulting cured products not only do not show definite melting points, but exhibit unsatisfactory flowability properties and give raise to poor or unacceptable coloring in the molded products.

Generally, it is known that cyclic oligomers, for example ε-caprolactam, may be polymerized by the ring opening polymerization technique so as to form polymers, including useful engineering plastics. For example, as well known, ε-caprolactam may be "ring-opening" polymerized to give nylon-6.

Recently, various reports have been made with respect to processes for producing large cyclic oligomers, methods for polymerizing such oligomers, and applications of the resulting polymers in production of composite materials. See, for example:

polycarbonate: ACS Polym. Prepr. 30 [2], 569 (1989)
polyarylate: ACS Polym. Prepr. 30 [2], 579 (1989)
polyether sulfone: ACS Polym. Prepr. 30 [2], 581 (1989)
polyimido siloxane: Macromolecules, 23, 4341 (1990); ibid. 23, 4514 (1990)
aromatic polyether: J. Chem. Soc, Chem. Commun. 1990, 336
Japanese Patent Public Disclosure, KOKAI. No. 3-88828

SUMMARY OF THE INVENTION

The present invention is intended to dissolve the problems or difficulties which have been experienced with the prior arts.

One of the objects of the invention is to provide polyarylene sulfides improved in heat resistance, chemical resistance, various mechanical and electrical properties, flowability, formability, moldability and other properties.

A specific object of the invention is to provide polyarylene sulfides that comprise substantially linear macromolecules accompanied with a very low proportion of cross-linked molecules, have much narrower molecular weight distribution and much lower contents of chlorine and alkali metal as compared with those of the conventionally prepared polyarylene sulfides.

A Further object of the invention is to provide a polyarylene sulfide having narrow molecular weight distributions. That is the polyarylene sulfide according to the invention may be prepared to have a narrow molecular weight distribution varying from a mode of low molecular weight range to a mode of high molecular weight range by controlling the polymerization degree.

A further object of the invention is to provide a novel process for preparing the above-specified polyarylene sulfides.

According, the invention provides a polyarylene sulfide which has a chlorine content of not greater than about 1,000 p.p.m. and weight average molecular weight, Mw, in the range of about 2,000–500,000 and exhibits a molecular weight distribution in the range of about 1.1 to about 5.0 as expressed as a ratio of Mw to its number average molecular weight, Mn.

The invention also provides a process for producing polyarylene sulfides which comprises:
providing at least one cyclic arylene sulfide aligomer of the formula

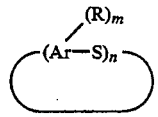

I wherein S represents a sulfur atom, groups Ar, which may be the same or different, represent each an arylene radical having 6–24 carbon atoms, groups R, which may be the same or different, represent each a $C_1$-$C_{12}$ alkyl radical, or a $C_1$-$C_{12}$ alkoxy radical, a $C_6$- $C_{24}$ arylene radical, or a primary, secondary, or tertiary amino group, n is an integer of from 2 to 50, and m is an integer of from 0 to 15, and heating said cyclic oligomer I in the presence of a ring opening polymerization catalyst so as to form polyarylene sulfide.

DETAILED DESCRIPTION OF THE INVENTION

The polyarylene sulfide according to the invention has a weight average molecular weight, Mw, in the range of from about 2,000 to about 500,000. If Mw is lower than about 2,000, the polymer exhibits poor mechanical properties and low chemical resistance. On the other hand, if Mw exceeds about 500,000, the polymer has an unacceptably high melt viscosity and hence shows poor flowability and moldability properties.

The polyarylene sulfide according to the invention has a molecular weight distribution of about 1.1 about 5.0, more preferably 1.1 to 4.0. If the Mw/Mn ratio exceeds about 5.0, the moldability and mechanical strength properties become deteriorated.

The polyarylene sulfide of the invention has a chlorine content of not greater than about 1,000 p.p.m., preferably not greater than 500 p.p.m.

Groups Ar in the cyclic arylene sulfide oligomer I which is used in the present invention represent each an arylene group having at least one aromatic ring and containing from 6to 24 carbon atoms. Examples thereof include phenylene, biphenylene, naphthalene ring, benzimidazole ring, benzthiazole ring, benzoxazole ring, benzotriazole ring, phthalimide ring and the like. Particularly preferred arylene groups are phenylene, biphenylene, naphthalene ring and benzimidazole ring.

Groups R in the cyclic oligomer I each represent independently a $C_1$- $C_{12}$ alkyl group, such as methyl, ethyl, propyl or butyl group; a $C_1$- $C_{12}$ alkoxy group, such as methoxy, ethoxy, propoxy, isopropoxy, butoxy, sec-butoxy or tert-butoxy group; a $C_6$- $C_{12}$ arylene group, such as phenylene, biphenylene or naphthalene group; a primary, secondary or tertiary amino group.

In the invention, an unsubstituted cyclic polyarylene sulfide oligomer I (where m=0) or substituted cyclic oligomers I having substituents such as alkyl group(s) (e.g. methyl, ethyl), alkoxy group(s) (e.g. methoxy, ethoxy), or amino group(s) are preferably used.

The value of n in the above formula I is an integer of from 2 to 50. In order to ensure a good solubility in solvent and/or an acceptably low melting point, it is preferred that the value n is the range of from 3 to 35, more preferably from 3 to 25.

The polymerizable arylene sulfide oligomer used in the invention may comprise an oligomeric compound of a single polymerization degree, or a mixture of cyclic oligomers of different polymerization degrees. The monomeric recurring units in one cyclic oligomer may be the same or different. Since a mixture of cyclic oligomers of different polymerization degrees has a lower melting point as compared with the corresponding single (pure) oligomers, it is preferred to use a mixture of cyclic oligomers for the purpose of the invention.

The cyclic oligomer material that is used in the invention may contain a minor proportion of linear oligomer(s) or a trace of an arylene sulfide unit-containing compound(s). Further, the cyclic oligomer material may contain a linear or cyclic polymer which has a low viscosity at the temperature at which the oligomer material remains liquid.

The ring opening polymerization catalyst used in the invention may be either cationic or anionic in the nature.

Examples of ionic compounds which may be used as an anionic ring opening polymerization catalyst include various metal salts, ammonium salts, and phosphonium salts or the like. For example, arylated or alkylated monohalides, aryloxides or alkyloxides, hydroxides, amides, hydrides, sulfides, halides, cyanides, carboxylates, carbonates, hydrogencarbonates, ammonium salts, phosphonium salts or tertiary amines of monovalent or divalent metals.

Among these, preferred are a class of ionic compounds of formula II which generate anionic sulfur or oxygen species:

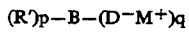

$$(R')_p-B-(D^-M^+)_q \qquad II$$

where R' represents a hydrogen atom; an alkyl group containing 1–12 carbon atoms, such as methyl, ethyl, propyl, butyl, sec-butyl, or tert-butyl group; an alkoxy group containing 1–12 carbon atoms, such as methoxy, ethoxy, propoxy, isopropoxy, butoxy, sec-butoxy, or tert-butoxy; an arylene group containing 6–24 carbon atoms, such as phenyl, biphenyl, or naphthyl group; a primary, secondary or tertiary amino group; a carboxyl group or an ester thereof; a nitro group; a cyano group; a sulfonic acid (or sulfonate) group; and the like. In particular, preferably R' represents a hydrogen atom; a lower alkyl group, such as methyl, ethyl, propyl, butyl, sec-butyl, tert-butyl; a lower alkoxy group, such as methoxy, ethoxy, propoxy, isopropoxy, butoxy, sec-butoxy, tert-butoxy; an amino group.

In the case where R' represents an electron donor group, such as a $C_1$-$C_{12}$ alkyl group, a $C_1$-$C_{12}$ alkoxy group, a $C_6$-$C_{24}$ arylene group, or a primary, secondary or tertiary amino group, the ring opening polymerization catalyst may be provided with an enhanced activity.

In formula II, B is an organic group containing 1–24 carbon atoms. With this definition, it should be appreciated that group B may be an arylene group containing 6–24 carbon atoms or a heterocyclic group, such as a pyridine, pyrimidine, imidazole, benzimidazole, benzoxazole or benzothiazole ring or the like. In view of the excellent stability at high temperature, preferably B is a phenylene, biphenylene, naphthalene, benzimidazole, benzothiazole, benzoxazole, benzotriazole or phthalimide ring or the like. More preferably, B is a phenylene, biphenylene, naphthalene or benzimidazole ring.

In formula II, $D^-$ represents an anionic species of sulfur or oxygen. Because of its high nucleophilic properties, the anionic species of sulfur is more preferred.

In formula II, $M^+$ represents an ion of monovalent metal, an ion of monohalide of divalent metal, an ammonium ion or a phosphonium ion. Because of availability, the monovalent metal ion or the monohalide ion of divalent metal is preferred. Further by selecting a suitable monovalent metal ion or a monohalide ion divalent metal, it is possible to optimize the process for a particular purpose. For example, employment of lithium ion having a smaller ion radius than sodium ion will result in an increased catalytic activity as compared with the case where sodium ion is employed as $M^+$. Further when potassium ion having a relatively large ion radius is employed, the resulting polymer will have an increase molecular weight as compared the case where a metallic ion having a radius smaller than that of potassium ion.

Particular examples of the ring opening polymerization catalysts which may be used in the invention are listed below for illustrative purpose. However, the invention is not limited to these specific ones.

Examples of the ring opening polymerization catalysts generating anionic species of sulfur include alkali metal salts (e.g. lithium salts, sodium salts or potassium salts) of thiophenol, 1,2-benzene dithiol, 1,3-benzene dithiol, 1,4-benzene dithiol, 2-thiocresol, 3-thiocresol, 4-thiocresol, 2-aminothiophenol, 3-aminothiophenol, 4-aminothiophenol, 2-methoxy benzene thiol, 3-methoxy benzene thiol, 4-methoxy benzene thiol, 4-nitro thiophenol, 4-t-butyl thiophenol, 3-dimethyl amino thiophenol, 4-dimethyl amino thiophenol, 2-chlorothiophenol, 3-chlorothiophenol, 4-chlorothiophenol, 2-bromothiophenol, 3-bromothiophenol, 4-bromothiophenol, 4-tert-butyl-1,2-benzene dithiol, mercaptoimidazole, mercaptobenzimidazole, mercaptobenzoxazole, mercaptobenzothiazole, or mercaptopyrimidine or the like.

Examples of the ring opening polymerization catalysts generating anionic species of oxygen include alkali metal salts (e.g. lithium salts, sodium salts or potassium salts) of phenol, 1,2-benzene diol, 1,3-benzene diol, 1,4-benzene diol, 2-cresol, 3-cresol, 4-cresol, 2-aminophenol, 3-aminophenol, 4-aminophenol, 2-methoxyphenol, 3-methoxyphenol, 4-methoxyphenol, 4-nitrophenol, 4-tert-butyl phenol, 3-dimethylamino phenol, 4-dimethylamino phenol, 2-chlorophenol, 3-chlorophenol, 4-chlorophenol, 2-bromophenol, 3-bromophenol, or 4-bromophenol or the like.

These anionic, ring opening polymerization catalysts may be used singly or in any suitable combination thereof. Examples of the cationic ring opening polymerization catalysts which may be used include protonic acids, Lewis acids, trialkyl oxonium salts, carbonium salts, diazonium salts, ammonium salts, alkylating agents, silylating agents and the like. Particular examples thereof which may be mentioned include strong protonic acids, such as trichloroacetic, trifluoroacetic, trichlorosulfonic and trifluorosulfonic acids, and the like; Lewis acids, such as boron trifluoride, aluminium chloride, aluminium bromide, titanium tetrachloride, stannous chloride, stannic chloride, antimony pentachloride, antimony pentafluoride, iron(III) chloride and the like; trialkyl oxonium salts, such as trimethyl oxonium tetrafluoroborate, triethyl oxonium tetrafluoroborate, and the like; carbonium salts, such as triphenyl carbonium hexafluorophosphate, triphenyl carbonium tetrafluoroborate, triphenyl carbonium hexachloroantimonate and the like; diaryl diazonium salts, such as diphenyl diazonium tetrafluoroborate, 4-chlorobenzene diazonium hexafluorophosphate, 4-nitrobenzene diazonium tetrafluoroborate and the like; sulfate esters, such as monomethyl sulfate, dimethyl sulfate, trifluoromethyl sulfate and the like; sulfonate esters, such as methyl trifluoromethane sulfonate, trimethylsilyl trifluoromethane sulfonate and the like; acetate esters, such as methyl trifluoroacetate and the like. Of these catalysts, particularly preferred are the diaryl diazoninm salts that are stable at elevated temperatures and trifluoromethane sulfonate esters that act as very effective alkylating agent for sulfur.

These cationic, ring opening polymerization catalysts may be used singly or in combination of two or more members.

The concentration of the ring opening polymerization catalyst used may be selected depending upon the intended level of molecular weight of polyarylene sulfide to be produced and also upon the nature of the catalyst itself, and usually ranges from about 0.001 to 20%, preferably 0.005–15%, more preferably 0.01–10%, by weight on the basis of the weight of the cyclic oligomer material.

The ring opening polymerization catalyst may be added as such to the reaction system. Alternatively, the cyclic oligomer may be first dissolved in an appropriate solvent, preferably in methylene chloride, and then the ring opening catalyst may be added to the solution and then the solvent may be removed from the mixture.

The temperature at which the ring opening polymerization is effected should be sufficient to melt the cyclic oligomer material but below the decomposition temperatures of both the ring opening polymerization catalyst and cyclic oligomer material used. If the polymerization temperature is excessively high, undesired side-reactions including curing of the cyclic oligomer material tend to take place. Usually the polymerization temperature will range from about 150° to about 400° C., preferably from 180° to 370° C., and more preferably 200° to 350° C.

The polymerization time is governed by factors, such as the nature of ring opening polymerization catalyst and the polymerization temperature, employed in the process. However, the polymerization time should be determined to prevent or control occurrence of the curing reaction of cyclic oligomer material. Usually, the polymerization time will preferably range from 0.1 to 100 hours.

The polymerization process may be effected not only in an ordinary polymerization vessel, but also in a mold in which an intended product is to be molded, or in an extruder through which an extrudate of polyarylene sulfide is to be formed.

Although, the polymerization is usually effected in the absence of any solvent, it is also possible to effect the polymerization in the presence of solvent. The solvent, if any, should be one that does not affect the polymerization activity. Usually, it is preferred that the solvent dissolves the cyclic oligomer material and the ring opening polymerization catalyst without deactivating the catalyst.

Examples of the solvents which may be preferably employed in combination with the cationic, ring opening polymerization catalysts include methylene chloride, chloroform, dichloroethane, dibromoethane, nitromethane, nitroethane, nitrobenzene, o-dichlorobenzene, 1-chloronaphthalene and the like. Other solvents which have been generally used in the known cationic polymerization processes may also be employed.

Examples of the solvents which may be preferably used in combination with the anionic catalysts include 1,3-dimethyl-2-imidazolidinone, hexamethyl phosphoric triamide, diphenyl sulfone, diphenyl ether, benzophenone, dimethyl acetamide, N-methyl-2-pyrrolidone, N-cyclohexyl-2-pyrrolidone, m-cresol and the like. Other solvents which have been conventionally used in the known anionic polymerization processes may be used in the present invention.

The solvents may be used singly or in any suitable combination of two or more members.

In the case where the solvent is employed in the polymerization process, the polymerization temperature may be in the range of about $-78°$ C. to about 400° C. depending on the nature of solvent employed. From the view point of the solubility of cyclic oligomer material, preferably the polymerization temperature will be in the range of 20° C. to 350° C.

The polyarylene sulfides, e.g. polyphenylene sulfide, prepared in accordance with the present invention exhibit excellent heat resistance, chemical resistance, mechanical characteristics and electrical characteristics. In particular, it is noted that since according to the invention the prior art difficulties with respect to the chlorine content and the alkali metal residue are significantly reduced, the products of the invention have especially improved electrical characteristics. Further, the present polymers have a very little content of cross-linked polymeric ingredients and a substantially linear macromolecular configuration and lie within a narrow range of molecular weight distribution. These reflect on their excellent flowability and moldability properties. In the present process, it is possible to control the molecular weight of the resulting polyarylene sulfide product by suitably adjusting the amount of ring opening catalyst employed in the process. Therefore, it is possible to obtain easily a polyarylene sulfide having a higher molecular weight and a narrower molecular weight distribution than those of the corresponding product that has been prepared by the conventional polycondensation technique.

The polyarylene sulfides according to the invention may be melt-blended with other various polymers to provide polymer alloys having improved chemical, physical and mechanical properties.

Examples of the polymers which may be blended with the present polyarylene sulfides include polyethylene, polypropylene, polybutadiene, polyisoprene, polychloroprene, polystyrene, polybutene, poly α-methylstyrene, polyvinyl acetate, polyvinyl chloride, polyacrylate, polymethacrylate, polyacrylonitrile, polyamides (e.g., nylon 6; nylon 6,6; nylon 6,10; nylon 12; nylon 11, nylon 4,6, etc.), polyesters (e.g., polyethylene terephthalate, polybutylene terephthalate, polyarylates, etc.), polyurethanes, polyacetals, polycarbonates, polyphenylene oxides, polyphenylene sulfide sulfones, polyphenylene sulfide ketones, polysulfones, polyether sulfones, polyaryl sulfones, polyether ketones, polyether ether ketones, polyimides, polyamide imides, silicone resins, phenoxy resins, fluorine resins, epoxy resins and the like; random, block or graft-copolymers thereof; and mixtures thereof.

If desired, the resulting polymer alloys may be incorporated with an additive before use, for example, reinforcing fillers, such as glass fibers, carbon fibers, ceramic fibers (e.g. alumina fibers), aramide fibers, wholly aromatic polyester fibers, metallic fibers and whiskers (e.g., of potassium titanate); inorganic fillers such as calcium carbonate, mica, talc, silica, barium sulfate, calcium sulfate, kaolin, clay, pyroferrite, bentonite, sericite, zeolite, nepheline syenite, attapulgite, wollastonite, ferrite, calcium silicate, magnesium carbonate, dolomite, antimony trioxide, zinc oxide, titanium oxide, magnesium oxide, iron oxides, molybdenum disulfide, graphite, gypsum, glass beads, powdered glass, glass balloons, quartz. quartz glass; and organic and inorganic pigments.

Further, conventional additives, for example, mold release agents, silane or titanate coupling agents, lubricants, heat stabilizers, weathering agents, nucleating agents, blowing agents, corrosion inhibitors, ion-trapping agents, flame-retardants and flame-proofing aids may be incorporated, if necessary.

The polyarylene sulfides of the present invention may be formed into various moldings, films, sheets, pipes, fibers and the like, with or without being incorporated with the above-mentioned other polymers, reinforcing fillers, inorganic fillers and other additives, by means of any suitable shaping or molding technique, such as injection molding or extrusion molding.

EXAMPLE

The invention will be further illustrated with reference to the following non-limiting Examples.

In each of the Examples, a mixture of cyclic phenylene sulfide oligomers of polymerization degrees mainly in the range of from 7 to 15 and substantially free of linear phenylene sulfide oligomers was used. The molecular weight was determined by the gel permeation chromatography technique and calculated on the commonly used polystyrene basis. The conditions that were used in the determination are listed below:
 elutant: 1-chloronaphthalene
 temperature: 210° C.
 detector: UV detector, 360 nm
 flow rate: 1.0 ml/minute
 injected amount : 200 μl (a slurry; 0.2 wt. %)

The melting point was determined in a DSC apparatus (manufactured by SEIKO ELECTRONICS) by holding a sample at 340° C. for 5 minutes, cooling down to 50° C. and heating again at a rate of 10° C./minute while measuring the melting point.

The melt viscosity was measured in a KOHKA-type flow tester at 300° C. with an orifice of 0.5 mm length and 2.0 mm diameter under a load of 10 kg.

PREPARATION 1

Recovery of cyclic phenylene sulfide oligomers

A 15 liter-capacity reactor vessel provided with a stirrer, a dehydrating column and a temperature controlling jacket was charged with 5 liters of N-methyl-2-pyrrolidone (NMP) and 1872.5 g of sodium sulfide (purity: 60.4% as $Na_2S$) and heated by means of the jacket to an interior temperature of about 205° C. with stirring so as to effect dehydration of the contents. By this heating, a distillate comprising mainly water of 420 g was distilled off. Thereafter, to the vessel, 2,153 g of p-dichlorobenzene was added and the mixture was raised to 250° C. and allowed to react For 3 hours at this temperature. Upon completion of the reaction, the reaction mixture was cooled to about 100° C. Then the interior pressure of the reactor was reduced and the mixture was reheated to withdraw 5,200 g of an effluent comprising mainly NMP through the dehydration column. Then the interior pressure was brought to atmospheric pressure, and 8 liters of water added to form an aqueous slurry, which was heated to 80° C. for 15 minutes with stirring and then withdrawn via an outlet at the bottom of the reactor vessel. The slurry was centrifugally separated to give a crude polymer product which was returned to the reactor vessel and heated at 180° C. for 30 minutes with 8 liters of added water under stirring. The aqueous slurry was cooled, withdrawn via the outlet at the bottom of reactor vessel and centrifugally separated to give a refined polymer product. Then the polymer was passed into a jacketed ribbon blender and dried therein. An yield of 1,450 g polymer was attained. The polymer had a melt viscosity of 240 poises.

A sample, 200 g, of the polymer was subjected to solvent extraction in a Soxhlet apparatus using methylene chloride as an extracting solvent. Then, the resulting saturated methylene chloride extract was poured into methanol to yield a precipitate, which was filtered off and dried to give 1.2 g of a cyclic phenylene sulfide oligomer composition. Mass spectrometric analysis and high-speed liquid chromatography exhibited that the composition comprised substantially of cyclic phenylene sulfide oligomers containing from 7 to 15 monomeric units. The oligomeric composition showed a melting point of 260° C.

EXAMPLE 1

A sample (540 mg) of the cyclic phenylene sulfide composition from Preparation 1 was charged with 1.8 mg of sodium salt of thiophenol into a 10 ml-capacity tubular polymerization reactor. Then the gas phase in the reactor was flushed with nitrogen. The reactor was hermetically sealed under vacuum and immersed in a molten salt bath at 300° C. for 30 minutes. A grayish white product was formed, which was then cooled to room temperature and ground to powder. The ground product was dissolved in 250 mls. of 1-chloronaphthalene at 230° C. The solution was cooled to room temperature to give a white precipitation, which was then filtered off, washed with methylene chloride and with methanol, and dried to give 430 mg of a white powdery product at a yield of 80%. The product showed a melting point of 285° C. The weight average molecular weight of the resulting polymer was found to be 61,000. The molecular weight distribution was 2.2 as expressed with Mw/Mn ratio.

Results of the elemental analysis are shown below:

| Elements | Found | Theoretical |
|---|---|---|
| C | 66.6% | 66.6% |
| H | 3.5% | 3.7% |
| S | 30.1% | 29.6% |
| N | 0% | 0% |
| Na | 200 p.p.m. | |
| Cl | 440 p.p.m. | |

The found Na and Cl contents are significantly lower than those of conventionally prepared products.

EXAMPLES 2-4

The polymerization procedure as described in Example 1 was repeated except that the sodium salt of thiophenol was employed in a proportion of 0.7%, 1.3% or 3.1% by weight of the weight of the cyclic phenylene sulfide oligomer composition. In each of the cases, a yield of around 80% was observed and a white powdery product was obtained. The weight average molecular weights of the polymer products ranged from about 15,000 to about 50,000 as shown in Table 1.

EXAMPLE 5

The procedure as described in Example 1 was repeated except that 1.7% by weight of sodium salt of 4-tert-butyl thiophenol was used as a ring opening polymerization catalyst in place of the sodium salt of thiophenol used in Example 1.

The results are set forth in Table 1.

EXAMPLES 6 AND 7

The procedure as described in Example 1 was repeated except that 1.1% by weight of lithium salt of thiophenol (Ex. 6) or 1.4% by weight of potassium salt of thiophenol (Ex. 7) was used as a ring opening polymerization catalyst in place of the sodium salt of thiophenol used in Example 1.

The results are set forth in Table 1.

EXAMPLE 8

A sample (540 mg) of the cyclic phenylene sulfide oligomer composition from Preparation 1 was dissolved in 10 mls. of 1,3-dimethyl-2-imidazolidinone. To the solution, 7.3 mg of sodium salt of thiophenol was added, and then the mixture was allowed to react at 250° C. for 6 hours under a nitrogen stream. After the reaction, the mixture was cooled to room temperature to precipitate a crude product, which was filtered off, washed with methylene chloride and with methanol, and dried to give a white powdery product at a yield of 39%. A melting point of 285° C. was found.

EXAMPLE 9

A sample (540 mg) of the cyclic phenylene sulfide oligomer composition from Preparation 1 was dissolved in 10 mls. of methylene chloride. To the solution, 0.0057 mls. of methyl ester of trifluoromethane sulfonic acid was added, and then the mixture was stirred for 24 hours at 25° C. under a nitrogen stream. Precipitation occurred during the reaction under stirring. After the reaction, the precipitate was filtered off, washed with methylene chloride and with methanol and dried to give a white powdery product at a yield of 33%. A melting point of 270° C. was found.

The results of Examples 1–9 are set forth in Table 1 together with the process conditions used.

TABLE 1

| Ex. | Polymerization Temp. °C. | Polymerization Time hrs. | Catalyst | Amount[6] of Catalyst wt. % | Solvents | Yield (%) | Weight average molecular weight ($\times 10^{-4}$) | Molecular weight distribution (Mw/Mn) | Cl Contents (ppm) | Alkali[8] metal Contents (ppm) |
|---|---|---|---|---|---|---|---|---|---|---|
| 1 | 300 | 0.5 | TPS[1] | 0.3 | — | 80 | 6.1 | 2.2 | 440 | 200 |
| 2 | 300 | 0.5 | TPS | 0.7 | — | 80 | 4.7 | 2.1 | 430 | 220 |
| 3 | 300 | 0.5 | TPS | 1.3 | — | 81 | 3.2 | 2.1 | 380 | 280 |
| 4 | 300 | 0.5 | TPS | 3.1 | — | 83 | 1.9 | 2.1 | 470 | 270 |
| 5 | 300 | 0.5 | BTPS[2] | 1.7 | — | 96 | 4.8 | 3.0 | 420 | 240 |
| 6 | 300 | 0.5 | TPL[3] | 1.1 | — | 94 | 4.2 | 2.5 | 440 | 50 |
| 7 | 300 | 0.5 | TPK[4] | 1.4 | — | 81 | 7.8 | 3.8 | 420 | 360 |
| 8 | 250 | 6.0 | TPS | 1.4 | DMI[7] | 39 | 0.9 | 3.2 | 160 | 40 |
| 9 | 25 | 24 | TFSM[5] | 1.5 | methylene chloride | 33 | 0.3 | 3.5 | 120 | <5 |

[1] Sodium salt of thiophenol
[2] Sodium salt of 4-tert-butyl thiophenol
[3] Lithium salt of thiophenol
[4] Potassium salt of thiophenol
[5] Methyl ester of trifluoromethane sulfonic acid
[6] Amount on the basis of weight of the cyclic phenylene sulfide oligomer composition
[7] 1,3-dimethyl-2-imidazolidinone
[8] determined with respect to the alkali metal content of the used catalyst

COMPARATIVE EXAMPLE 1

A polyphenylene sulfide product was produced by a procedure similar to that of Preparation 1. The resulting polyphenylene sulfide exhibited a melting point of 280° C. and a weight average molecular weight of 28,000. However, this product showed a molecular weight distribution as broad as 6.8 expressed as Mw/Mn ratio. Elemental analysis of the product revealed an Na content of 1,300 p.p.m. and a Cl content of 2,200 p.p.m., both being much higher than those found in the preceding Examples.

COMPARATIVE EXAMPLE 2

A sample (540 mg) of the cyclic phenylene sulfide composition from Preparation 1 was reacted under conditions similar to those of Example 1 but in the absence of the ring-opening polymerization catalyst. A dark product resulted therefrom, which was found to be a cross-linked polymer and was insoluble in part in 1-chloronaphthalene at 230° C.

As clearly shown by the foregoing, the invention provides substantially linear polyarylene sulfides containing little or no cross-linked polymeric molecules, having much lower chlorine and alkali metal contents and much narrower molecular weight distribution as compared with the conventionally prepared polyarylene sulfides. According to the invention, the polyarylene sulfides may be prepared to have various grades of molecular weight while retaining the above-mentioned characteristics.

What is claimed is:

1. A process for producing polyarylene sulfides which comprises:
    providing at least one cyclic arylene sulfide oligomer of the formula

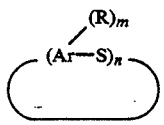

wherein S represents a sulfur atom, groups Ar, which may be the same or different, each represent an arylene radical having 6–24 carbon atoms, groups R, which may be the same or different, represent a electron donor group selected from the group consisting of a $C_1$-$C_{12}$ alkyl radical, or a $C_1$-$C_{12}$ alkoxy radical, and a primary, secondary or tertiary amino group, n is an integer of from 2 to 50, and m is an integer of from 0 to 15, and heating said cyclic oligomer I in the presence of a ring opening polymerization catalyst so as to form polyarylene sulfide, wherein the ring opening polymerization catalyst comprises an ionic compound of formula II

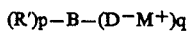

where R' represents a member selected from the group consisting of a hydrogen atom, an alkyl group containing 1–12 carbon atoms, an alkoxy group containing 1–12 carbon atoms, an arylene group containing 6–24 carbon atoms, a primary, secondary or tertiary amino group, a carboxyl group or an ester thereof, a cyano group, a sulfonic acid group, and a halogen atom, B represents an organic group containing 1–24 carbon atoms, $D^-$ represents an anionic species of sulfur, $M^+$ represents a member selected from the group consisting of a monovalent metallic ion, an ion of a monohalide of a divalent metal, an ammonium ion and a phosphonium ion, p is an integer in the range of from 0 to 15, and g is an integer in the range of from 1 to 15.

2. A process according to claim 1, wherein groups Ar are phenylene, biphenylene, naphthalene, or benzimidazole rings.

3. A process according to claim 1 wherein groups R are alkyl, alkoxy or amino groups.

4. A process according to claim 1 wherein the value of n ranges from 3 to 25.

5. A process according to claim 1 wherein a mixture of two or more cyclic oligomers is employed.

6. A process according to claim 1 wherein the ring opening polymerization catalyst is employed in a proportion of about 0.001–20% by weight of the cyclic oligomer material.

7. A process according to claim 1 wherein the polymerization temperature is in the range of about 150°–400° C.

8. A process according to claim 1 wherein the polymerization time is from 0.1 to 100 hours.

9. A process according to claim 1 wherein the process is carried out in the presence of a solvent which does not deactivate the catalyst for ring opening polymerization.

10. A process according to claim 9 wherein the polymerization temperature is in the range of about −78° C. to about 400° C.

11. A process according to claim 1 wherein a ring opening polymerization catalyst of formula II in which R' represents an electron donor group is used.

12. A process according to claim 1 wherein the resulting polyarylene sulfide has a chloride content of not greater than about 1,000 ppm, a weight average molecular weight Mw in the range of about 2,000–500,000 and exhibits a molecular weight distribution in the range of about 1.1 to about 5.0, expressed as a ratio of Mw to its number average molecular weight, Mn.

13. A process according to claim 12 wherein the ratio of Mw to Mn is in the range of from 1.1 to 4.0.

14. A process according to claim 12 wherein the chlorine content is not greater than 500 ppm.

* * * * *